(No Model.) 9 Sheets—Sheet 1.

L. DOW.
TYPE DISTRIBUTING MACHINE.

No. 394,255. Patented Dec. 11, 1888.

WITNESSES.
T. G. Fischer.
H. S. Boyden.

INVENTOR.
Lorenzo Dow,
By his Attorney
L. Deane.

(No Model.)

9 Sheets—Sheet 2.

L. DOW.
TYPE DISTRIBUTING MACHINE.

No. 394,255. Patented Dec. 11, 1888.

WITNESSES.
T.J. Fischer.
W.S. Boyden.

By his Attorney

INVENTOR.
Lorenzo Dow.
L. Deane (No Model.) 9 Sheets—Sheet 4.

L. DOW.
TYPE DISTRIBUTING MACHINE.

No. 394,255. Patented Dec. 11, 1888.

WITNESSES:
T. G. Fischer.
W. S. Boyden.

By his Attorney

INVENTOR,
Lorenzo Dow,
L. Deane (No Model.) 9 Sheets—Sheet 5.

L. DOW.
TYPE DISTRIBUTING MACHINE.

No. 394,255. Patented Dec. 11, 1888.

WITNESSES.
T. S. Fischers.
W. S. Boyden.

INVENTOR.
Lorenzo Dow,
By his Attorney L. Deane (No Model.) 9 Sheets—Sheet 6.

L. DOW.
TYPE DISTRIBUTING MACHINE.

No. 394,255. Patented Dec. 11, 1888.

WITNESSES,
T. J. Fischer.
W. L. Boyden.

INVENTOR,
Lorenzo Dow.
By his Attorney
L. Deane (No Model.) 9 Sheets—Sheet 7.
L. DOW.
TYPE DISTRIBUTING MACHINE.
No. 394,255. Patented Dec. 11, 1888.
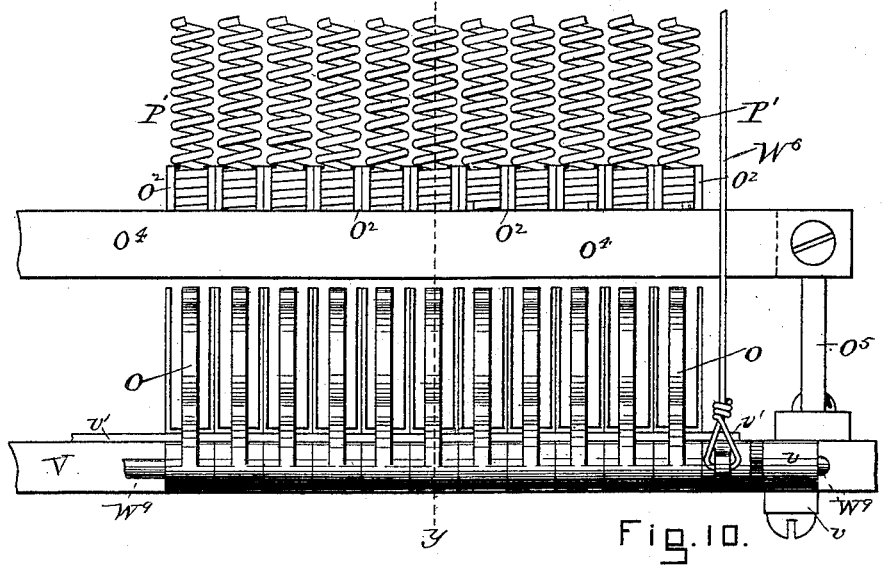
Fig. 10.
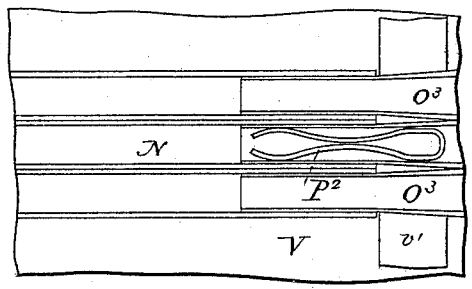
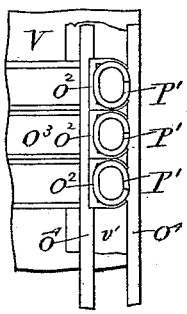
Fig. 11.
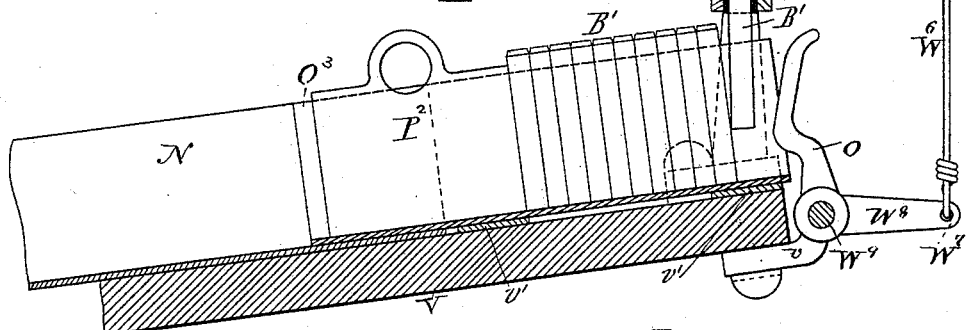
Fig. 12.
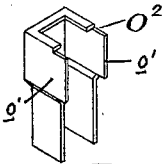
Fig. 13.
WITNESSES.
T. S. Fischer,
W. S. Boyden.
INVENTOR,
Lorenzo Dow.
By L. Deane
Atty.

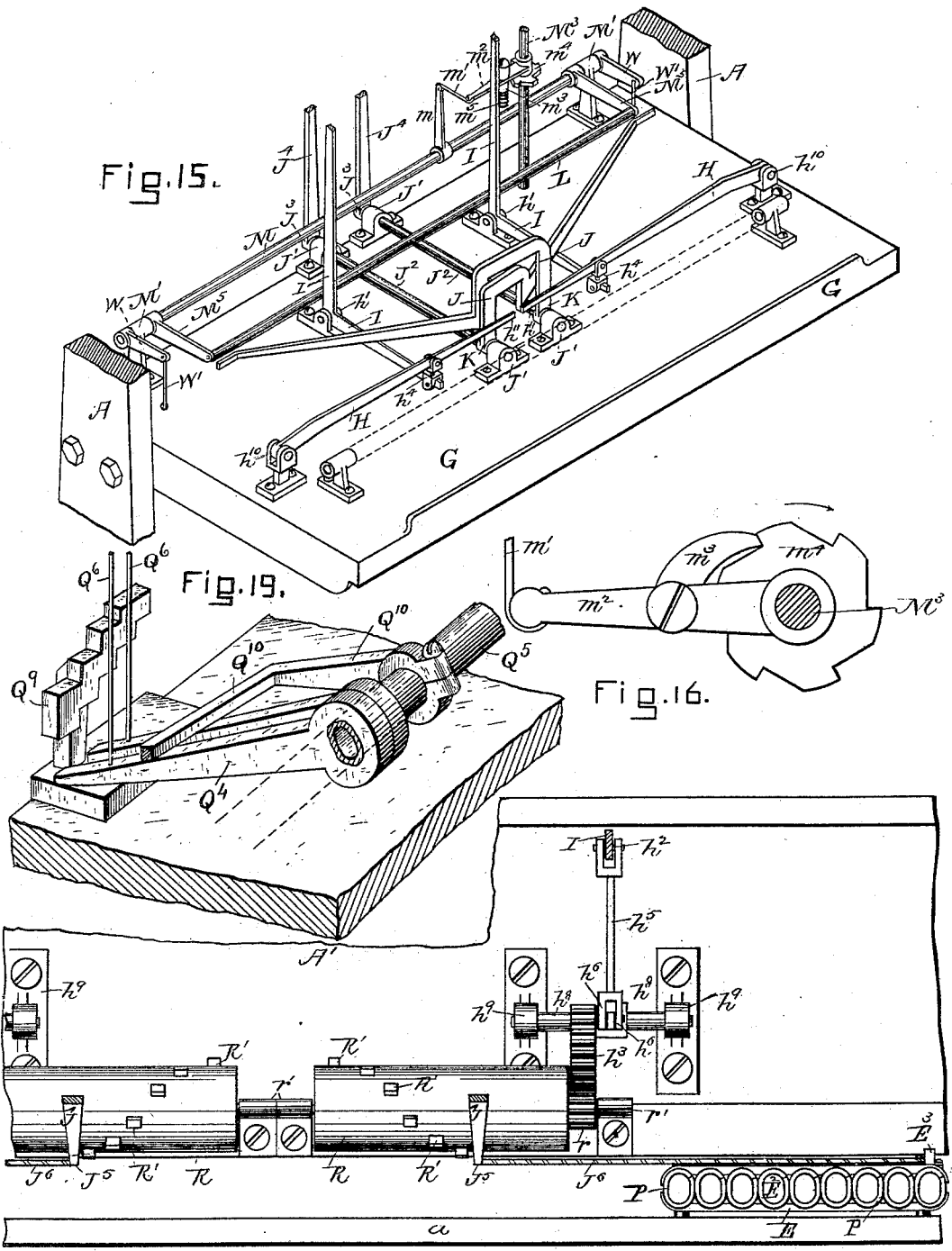

(No Model.) 9 Sheets—Sheet 9.

L. DOW.
TYPE DISTRIBUTING MACHINE.

No. 394,255. Patented Dec. 11, 1888.

WITNESSES.
M. Redman.
J. Henry Kaiser

INVENTOR.
Lorenzo Dow,
By his Attorney
L. Deane

UNITED STATES PATENT OFFICE.

LORENZO DOW, OF BOSTON, MASSACHUSETTS, ASSIGNOR TO THE AMERICAN TYPE SETTER COMPANY, OF PORTLAND, MAINE.

TYPE-DISTRIBUTING MACHINE.

SPECIFICATION forming part of Letters Patent No. 394,255, dated December 11, 1888.

Application filed November 18, 1886. Serial No. 219,234. (No model.)

*To all whom it may concern:*

Be it known that I, LORENZO DOW, a citizen of the United States, residing at Boston, in the county of Suffolk and State of Massachusetts, have invented certain new and useful Improvements in Type-Distributing Machines, of which the following is a specification, reference being had therein to the accompanying drawings.

My invention relates to a method for the more rapid distribution of type than can be effected by hand. I use the ordinary type, and by means of a key-board and a series of conveying tubes or channels I place each letter in a receptacle appropriated to that letter only, whence they are removed to the setting-machine.

Figure 1:
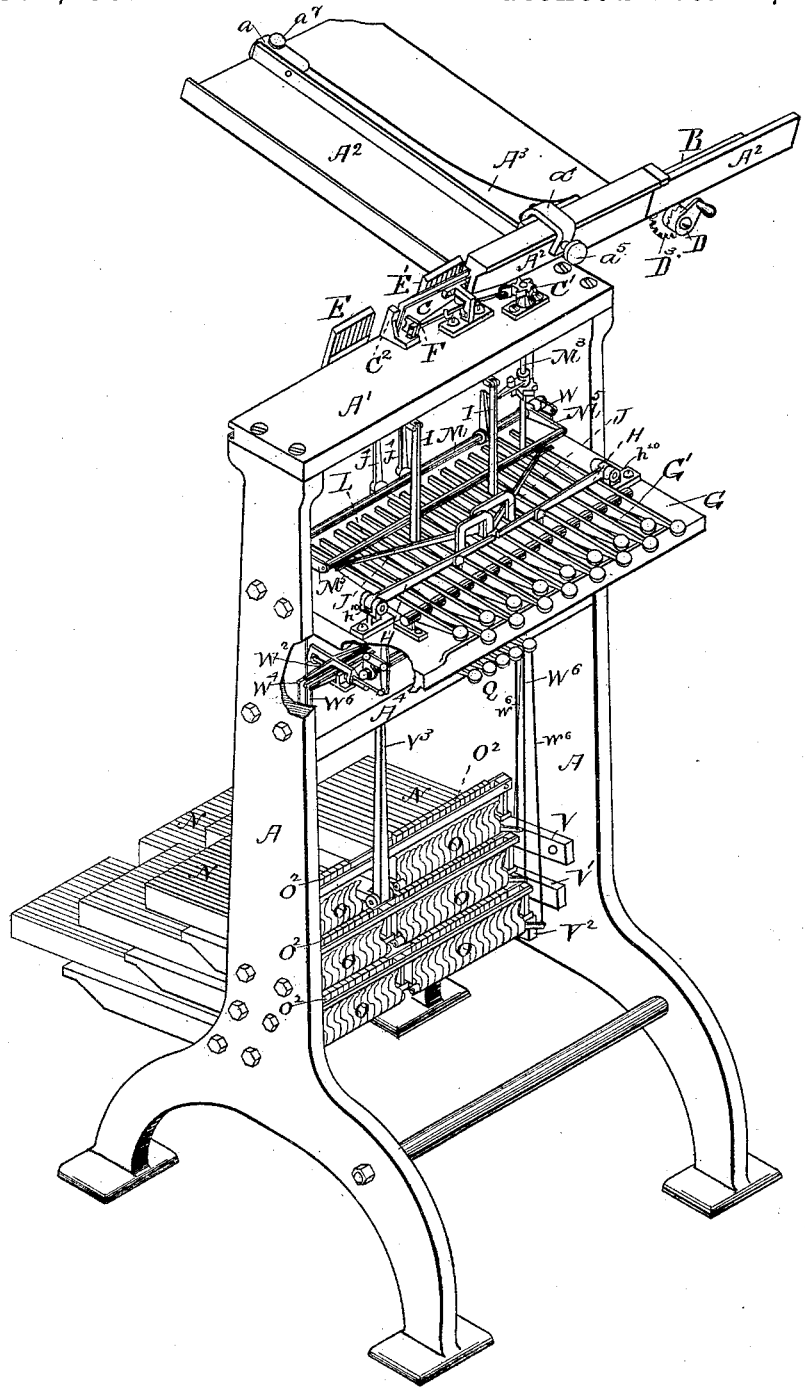
Figure 2:
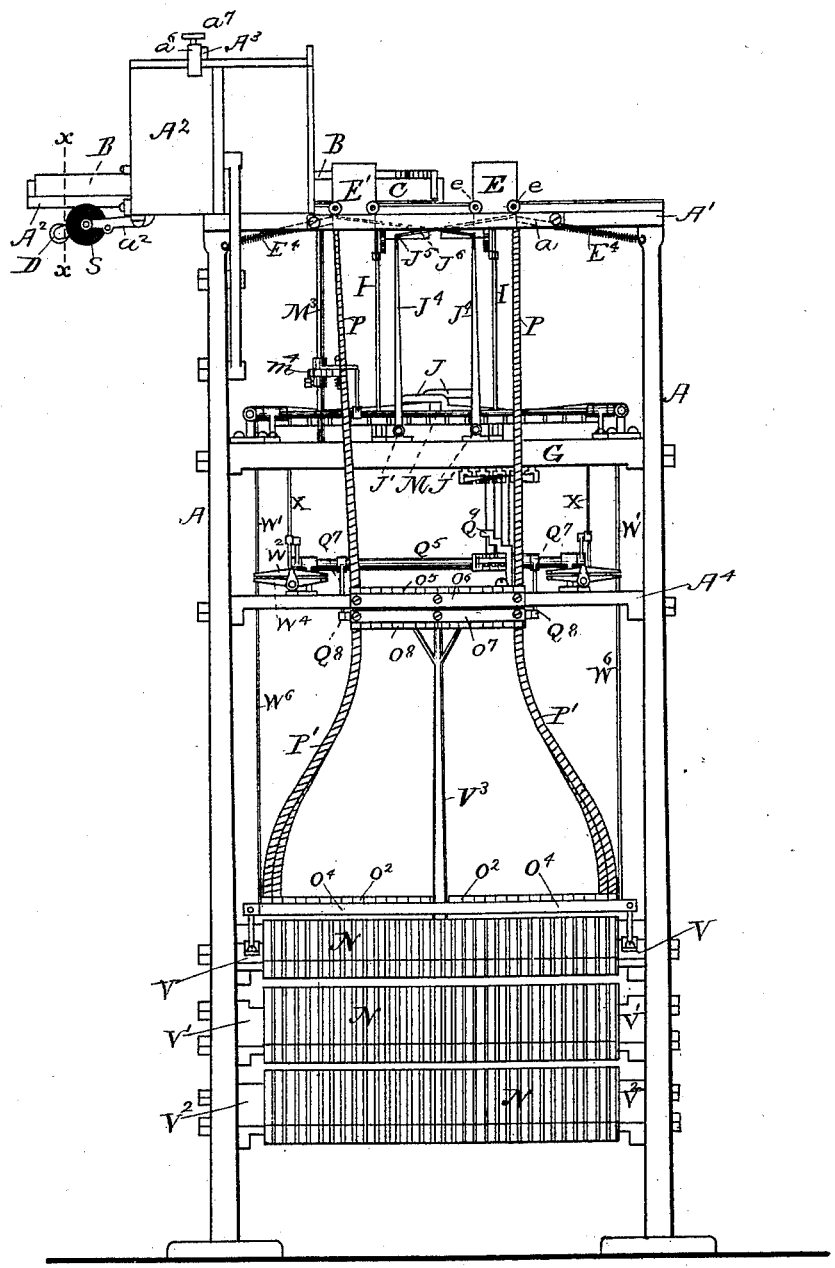
Figure 3:
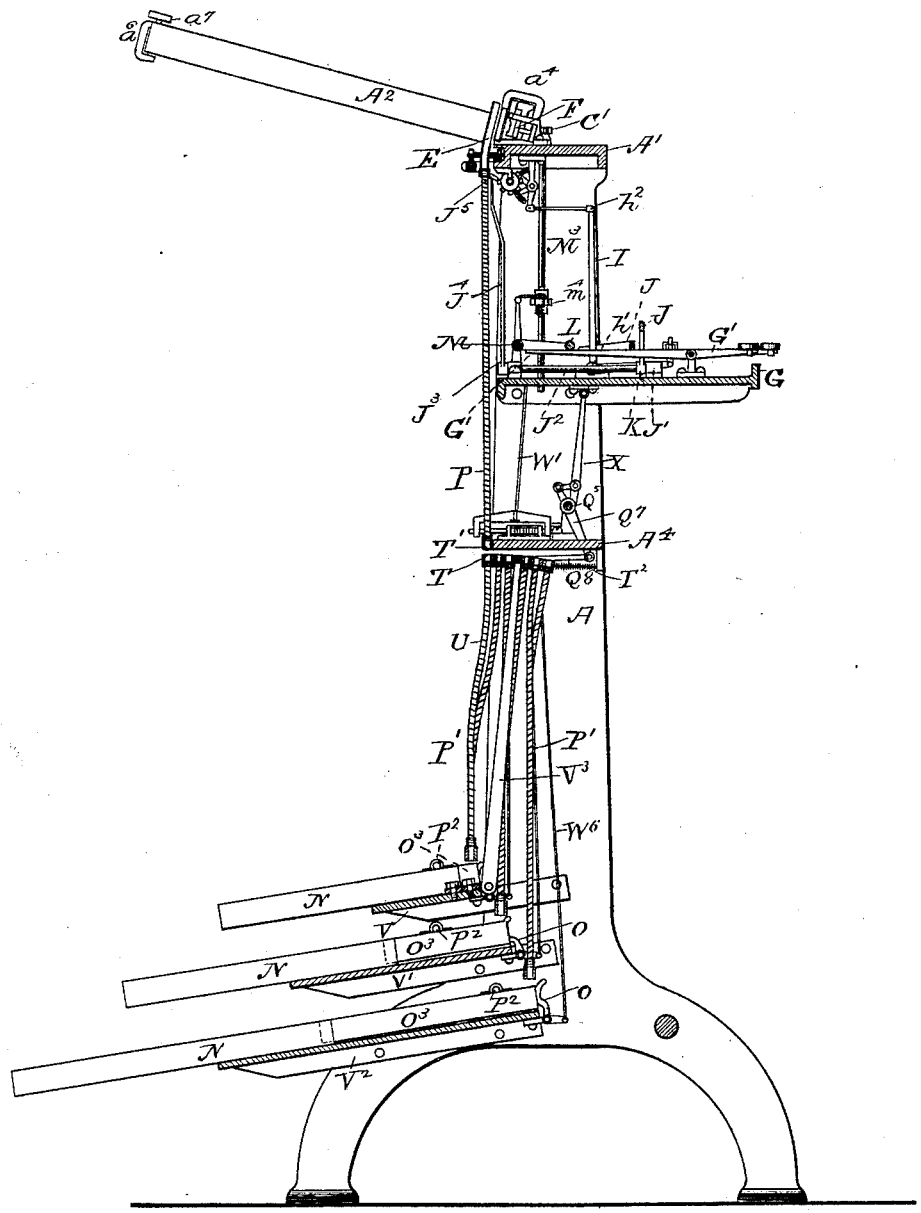
Figure 4:
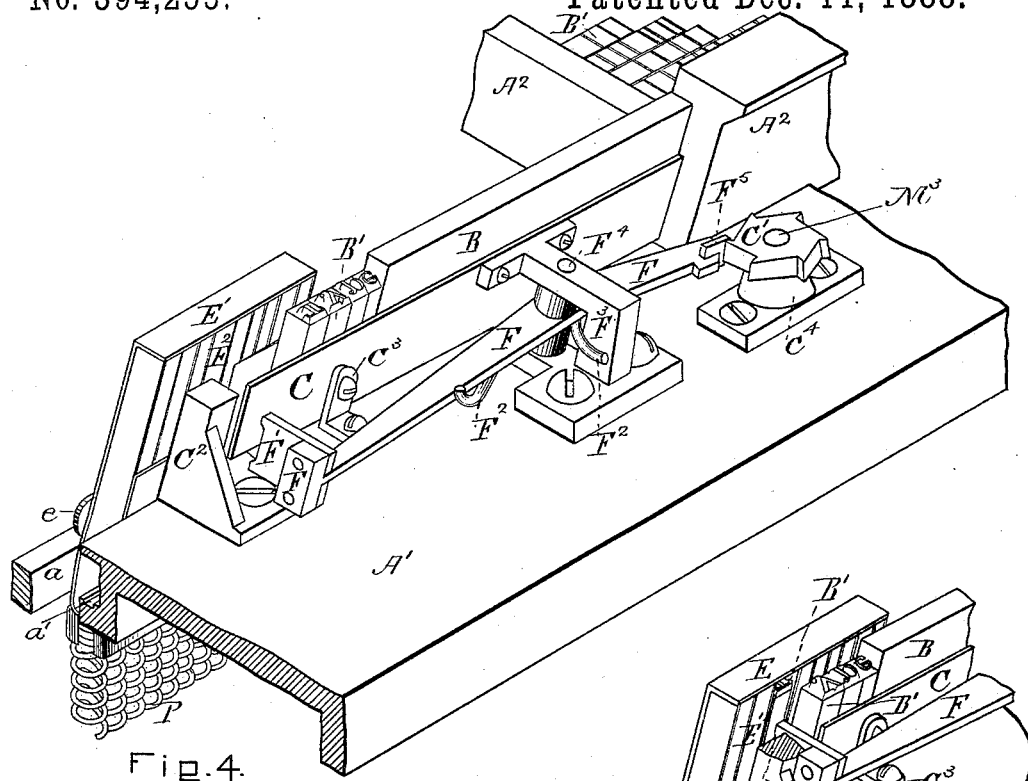
Figure 5:
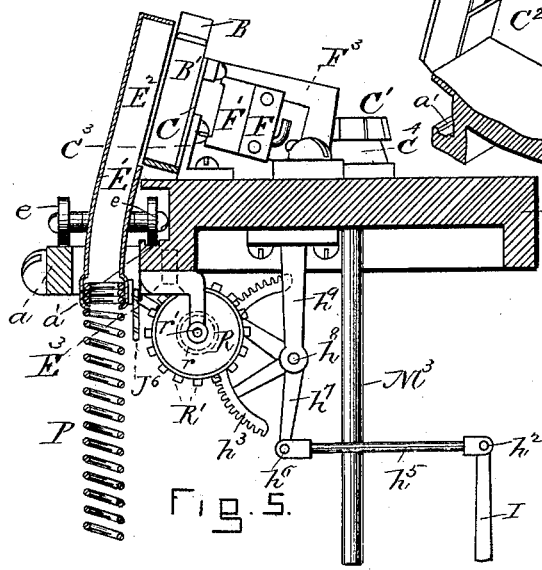
Figure 14:
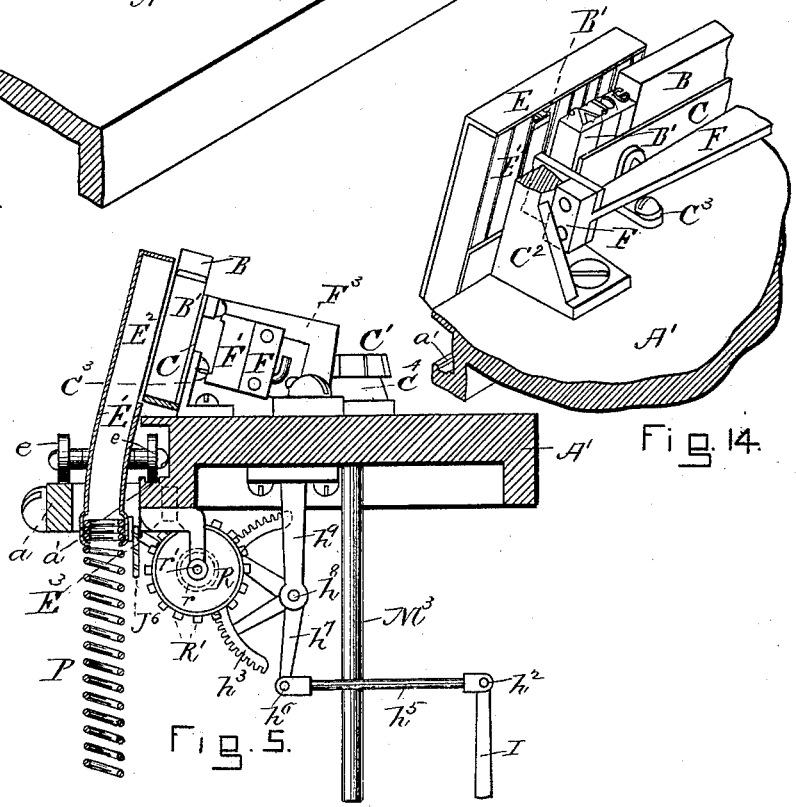
Figure 6:
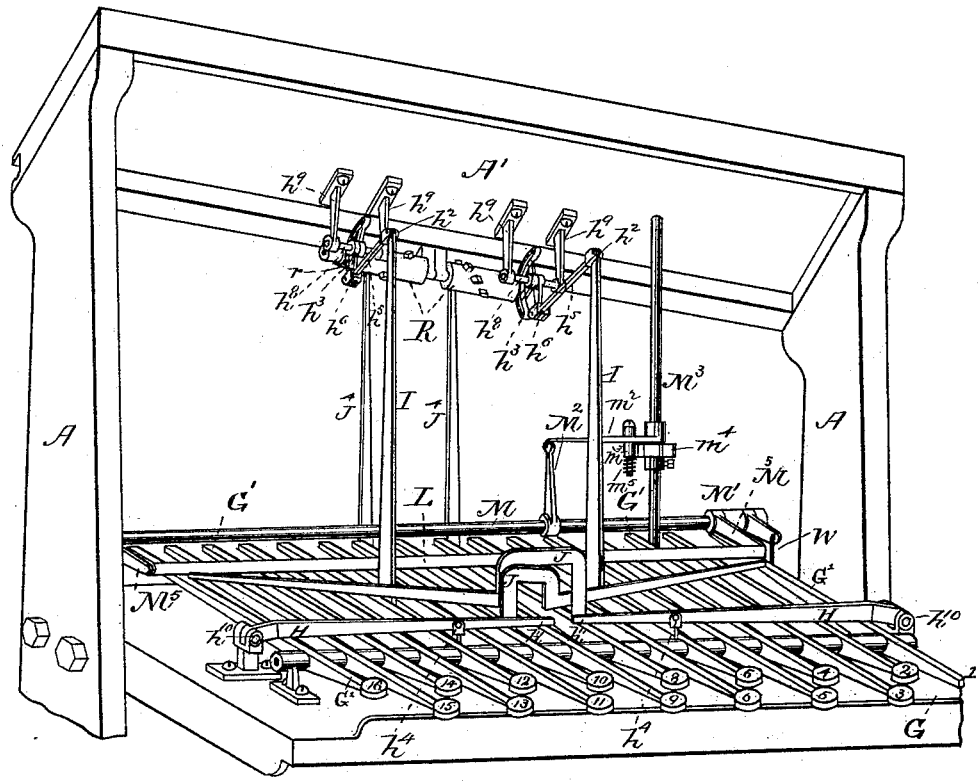
Figure 9:
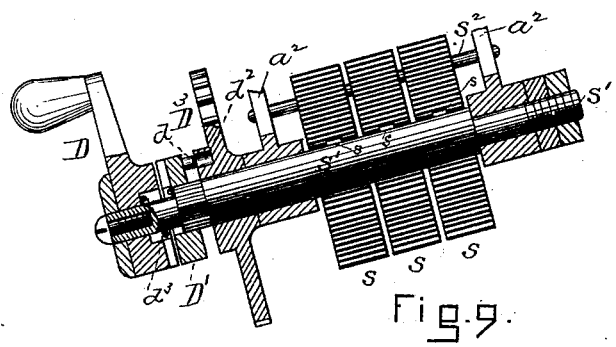
Figure 7:
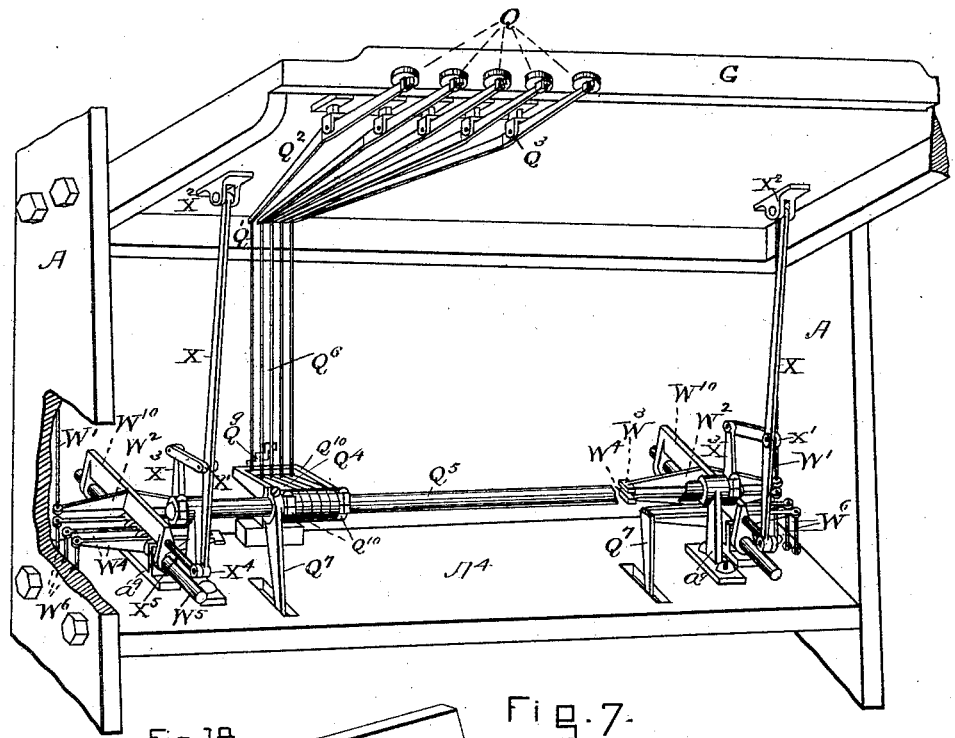
Figures 8, 18:
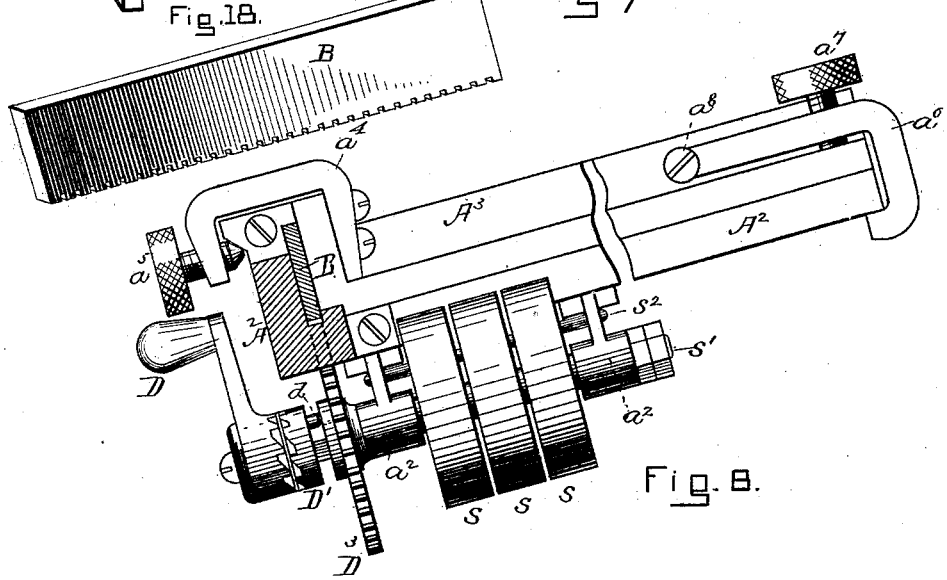
Figure 20:
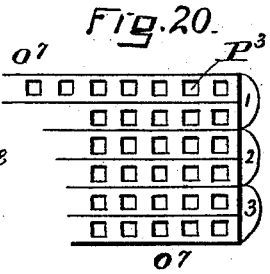
Figure 21:
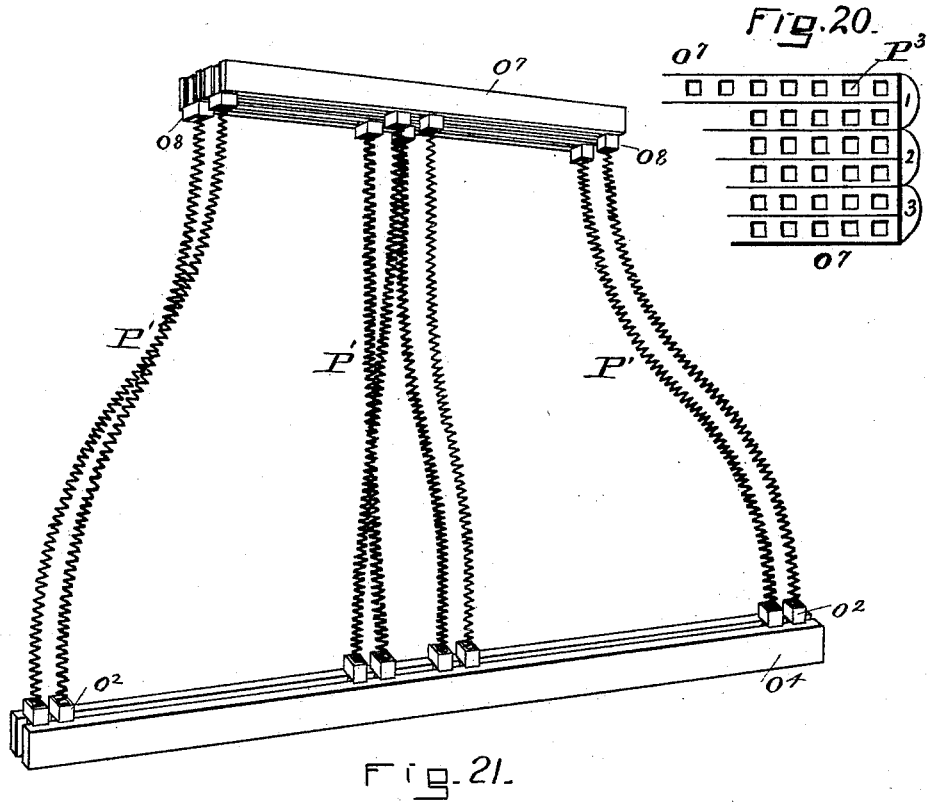
Figure 22:
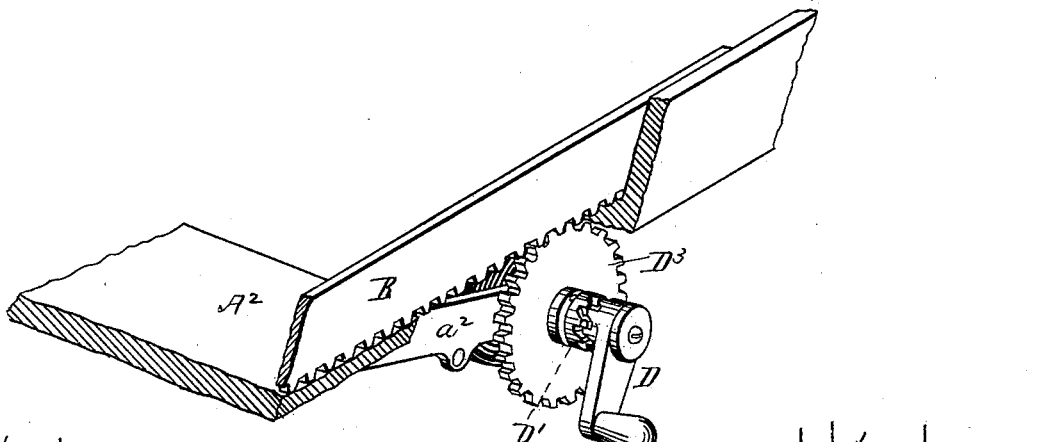

In the accompanying drawings, Figure 1 is a perspective view of my type-distributing machine, a portion of the frame and key-board being broken out to show parts more clearly and all the type-channels being removed. Fig. 2 is a rear elevation, all but two sets of the continuous type-channels being omitted. Fig. 3 is a cross vertical section looking toward the right of Fig. 1. Fig. 4 is an enlarged perspective view of a portion of the table A', showing more particularly the construction of the type-channels, type-receiver, and pusher. Fig. 5 is an enlarged view of what is shown in the upper part of Fig. 3, the type-receivers having been brought forward to the section. Fig. 6 is an enlarged detail, in perspective, showing the under side of the table A' and the upper side of the key-board and their different parts in connection. Fig. 7 is an enlarged detail, in perspective, showing the under side of the key-board G and the upper side of the table A⁴, their supporting parts, and connections. Fig. 8 is an enlarged detailed view showing the construction of the pusher-operating mechanism and dead-matter galley, the pusher being in section. Fig. 9 is a vertical section of such parts of Fig. 8 as relate to the pusher-actuating mechanism. Figs. 10, 11, 12, and 13 are enlarged details that relate to the final distribution of the type, Fig. 10 being a rear elevation of a portion of the table V and its supported parts, Fig. 11 a plan of a portion of what is shown in Fig. 10, Fig. 12 a vertical section on the line $y\ y$ of Fig. 10, looking toward the right, and Fig. 13 a perspective view of the type-channel mouths. Fig. 14 is a perspective view of a portion of what is shown in Fig. 4, the pusher having made its stroke. Fig. 15 is a perspective view of the key-board G and its levers, the keys having been removed. Fig. 16 is an enlarged detail in plan of the ratchet and pawl $m^2$, $m^3$, and $m^4$. Fig. 17 is an enlarged plan of the under side of a portion of the table A'. Fig. 18 is a detail showing the pusher in the channel taking type from the galley. Fig. 19 is a perspective view showing the stair-shaped stop and its immediate connections. Fig. 20 is a detail in plan showing the mouths for the lower sets of tubes; Fig. 21, detail in perspective showing the lower set of tubes and their upper and lower connections; Fig. 22, detail showing part of the mechanism for operating the pushers.

In Fig. 1, A is the frame which supports the various mechanical arrangements of the machine, and A' is the top part of the same.

A² is the galley on which the dead matter rests, and down which it moves by gravity or other means as line by line is cut off by the sliding bar B, which pushes the type forward along the channel C to the end thereof, whence they are expelled one at a time. The sliding bar B is actuated by one or more coiled springs, Figs. 2, 8, and 9, and when the type pushed before it are all pushed out it is returned for another charge by the ratchet-wheel D³ and associate parts, or this bar may be actuated by a weight or other means.

E and E' are two removable receivers containing a recess for each type, or each kind of type, into which they are pushed or thrust by the hammer or pusher, each recess being of appropriate width to receive and conduct the predetermined type, each recess being connected at its lower end with a tube, P, preferably of coiled wire, (as a superior method of construction,) in order to be light and flexible, down which the type is conducted, as explained hereinafter.

G is a key-board, whose levers G' actuate the mechanism by which the type are expelled.

H H are levers extended transversely to the levers of the key-board, and are hinged or fulcrumed at $h^{10}$, the end $h^{11}$ being free and movable. This mechanism is more fully shown in Fig. 6, where G is the key-board and 1 2 3, &c., are key-heads, lettered as hereinafter explained. These levers G' are shown as hinged near the middle, so that the depression of a key-head raises the other end thereof. There is no difficulty in hinging them at the other end from the lettered key-head, making them levers of the second order. It would be merely a mechanical equivalent to make these levers of the third order.

J J are two levers also crossing the levers of the key-board and attached at the ends K K to the movable shaft $J^2$, Fig. 15, the other end being free to move as the levers G' are moved. It will be seen that the transverse levers H H are not hinged at the same end as the levers J J, but at the opposite ends, so that by the movement of the levers G' the free end of H and J describe angular distances differing with each lever G' moved, but having a certain relation each to the other. The uses of these levers will be described farther on. There is also a roller, L, lying across the levers G' and at right angles thereto. The movement of any one of the levers G' moves every part of this roller through the same angle, its function being to communicate a uniform and definite angular movement to the bar M, adapted to receive and distribute it, as described farther on. This roller is rigidly attached to the rocking shaft M by the arms $M^5$ at its ends, so that if any key of the key-board is depressed the whole length of the roll L and M moves simultaneously.

N N, Figs. 3 and 12, are channels or troughs into which the type are distributed.

O O, Figs. 3 and 12, are pushers that move forward each type after it falls through the channels P P. (Shown in Figs. 2 and 3.)

I now proceed to a more particular description of my machine, having indicated such of its principal parts as are necessary to a comprehension of its general plan.

In Fig. 6 the key-board G is shown with its several keys G'. The number of the keys shown is only sixteen; but this is to enable the draftsman to exhibit more distinctly the construction. I use any desired number of these keys—say from thirty to thirty-six—depending on the number of characters to be distributed. With twenty-six keys I distribute the whole American case. To do this at least five characters must pass into each one of the thirty-six recesses of the receivers in E and E', and the further separation must take place at another stage of the journey of the letters from their starting-point to their final resting-place in the channels N N. For example, there are five letters A, large and small, in each font and five of a kind of all other letters of the alphabet. All the A's pass into one channel and all the B's into another, and so on. Besides the twenty-six letters, the figures, marks, and signs could also pass into some one designated for the purpose.

Upon depressing a key of the key-board— say 2—the transverse levers H and J, Fig. 6, would both be moved through different angular distances. Whatever key is depressed different distances will be traversed by the free end of these levers, because no two levers G' act upon them at the same distance from their fulcrum. The lever H is connected with one arm of the right-angled or bell-crank lever I at $h^4$, Fig. 15. The other arm of this bell-crank lever extends up to $h^2$, where it connects with and gives motion to an arm, $h^5$, on whose spindle is a toothed sector, $h^3$, meshing with a small gear, $r$, (shown in Fig. 17,) which is shown, also, in Fig. 5, at R. This pinion is secured to and actuates the roll R, on which are pins or teeth R', arranged vertically, as shown at R' in Fig. 17. The depression of any key-head—say 2—will operate the lever I and by its connection cause this cylinder or roll to revolve a certain distance. The movement of any other key-head would move this cylinder through a different distance, depending upon the length of the arc traversed by the free end of the lever H. These pins or teeth R' or their equivalents are stops to arrest the movement of the receiver E', Fig. 4, or E, Fig. 14, when the recess in said receiver has been brought exactly in position to receive the letter called for by the key depressed. But for this stop the proper opening in the receiver E might pass by the opening in the channel C from which it should receive its type, owing to the momentum of its rapid movement to reach its position. Having, I think, made clear the functions of this transverse lever H and shown its connections, I will explain the use and connections of the transverse lever J, fixed at one end to the rocking bar $J^2$, so that the free end describes an arc varying as different keys are depressed. It will be seen that these transverse levers H and J are hinged at ends opposite with respect to each other, one on the right hand and the other on the left. The effect of this is to cause the free end of these levers to move in arcs having a certain fixed and inverse relation to each other. The depression of any key moves each a definite distance, and this distance continually varies, depending upon the proximity or remoteness of the actuating key-lever to the fulcrum of these transverse levers.

The function of the transverse lever J is to remove the receiver E and to cause it, in conjunction with the stop-roll R, above described, to present at the opening in the channel C through which each type is pushed out the proper recess or mouth $E^2$, Figs. 4 and 5, to receive the letter required by the operator. The lever J moves the receiver E to its position and limits its motion to that point designed and set apart for the particular type designed. The lever J is rigidly connected with a bar, $J^2$, that easily and freely rotates at J', and which bar at J³ is firmly connected with the arm J⁴, and this, through the connecting-rod J⁵, with the movable receivers E and E', and actuates them, as shown in Figs. 2 and 5. The piece E³, Fig. 5, is connected with the receiver on the inner face at its lower end near the beginning of the tubes P, and is designed to co-operate with the pins or teeth R' of the stop-cylinder R, one of which presents itself in front of E³ to arrest its movement at the right point, as determined by the co-operation of the stop-cylinder mechanism operated by the key used, as before explained. The transverse bar L, Figs. 3 and 6, is also seen to be moved by the movement of each key-lever; but since it is the free portion of a rocking frame whose pivoted side is M, with bearings at M' in Fig. 6, its movements are always through the same arc whatever key is depressed, since the pivoted shaft M is parallel with the fulcrum of the key-levers. This bar performs two different functions:

First. It actuates the mechanism that expels the end type from the channel C into one of the recesses in E E'. This is accomplished as follows: By the partial rotation of the shaft M, Fig. 6, the lever M² is moved. This lever is connected with the arm $m^2$, which at its other end operates a ratchet, $m^4$, upon the vertical shaft M³, so that a movement, as described, of the lever M² causes a partial rotation of the upright shaft M³. Attached to this shaft M³ at its upper end, Fig. 4, is a ratchet-wheel, C', whose teeth operate upon the end of the lever F, the opposite end of which lever carries the hammer or pusher F', for expelling the end type from the opening in the channel C. This lever F, at its end bearing on the teeth of the ratchet-wheel, is pushed forward by the rotation of this ratchet-wheel, which retracts the opposite end of this lever, carrying the pusher or hammer far enough to allow the column of dead matter in channel C to be moved up by the springs S S S through pusher B, Figs. 2 and 4, causing the end type to occupy the place vacated by the retracted hammer F', Fig. 4, and to stand in front of it at the instant of the release of the ratchet end of the lever F. As soon as the tooth of the ratchet-wheel in its rotation releases the end of this lever F, the spring F², Fig. 4, forces the hammer F' against the end letter and drives or thrusts it into the recess E² in the receiver E, awaiting it, as before explained on the depression of its key by the operator.

Second. This same bar, L, by its movement operates the pushers O O O to advance the type as they fall into the channels N N N, as hereinafter explained.

Having, I think, fully described the operation of the key-board and the several pieces of mechanism therewith connected and thereby actuated and the functions of each, I will now explain other parts of the machine, their operation and connection.

The galley A², on which the dead matter is placed, may be horizontal or preferably inclined at such an angle that gravity will feed the dead matter down as line by line is cut off and pushed forward in the channel C by the pusher-bar B, Fig. 1; or, if this galley be horizontal, the matter may be pushed forward by any convenient means, as by a weight or by a spring, to the position to be cut off line by line by the pusher-bar B. This pusher-bar B, a partial longitudinal vertical section of which is shown in Fig. 9, is actuated, as is represented in Fig. 8, by one or more coiled springs, S S S, one end of which spring is attached to the shaft S' at s, passing through them, and around which they are coiled, and the other end thereof to the bar S². It is clear from said Figs. 8 and 9 that these springs may uncoil, rotating the shaft S'. On this shaft is the geared wheel D³, whose gears mesh into gears cut in the lower side of the pusher-bar B, Fig. 8, and actuate it as the springs unwind. This movement of unwinding causes the bar B to advance, pushing before it in the channels C the line of type cut off from the dead matter in the galley A² as the end letter is expelled by the hammer F'. When the bar B has advanced along the channel C to the limit of its range of movement, it is retracted along the channel C by the crank D, which reverses the rotation of the shaft S' and brings the bar B back to a position to take another load of type and push it along, as has been explained. The stop C² at the end of channel C prevents the type from going beyond the desired recess in the receiver, the instant the hammer F' has been withdrawn, as before explained, thus placing the final letter of the line in the channel C in such position that the hammer F' upon its release, forced by the spring F², will drive this end type into the recess E² of the receiver E. This receiver E, with its mate E', is, in fact, only the extension of the tubes P in Fig. 4, with the openings at their sides, which form the recesses into which the type are forced by the hammer F'. Down these tubes the type fall foot foremost by gravity through the tubes P and P' into the channels N N. Each receiver carries the end of one-half the tubes or channels required in this part of the machine. There would be sixteen or twenty, according to the number of the type of different kinds to be distributed— that is, according to the size of the case. I have found sixteen recesses or mouths sufficient for ninety characters. Each machine would have but two receivers, one on each side of the opening in C, whence the type issue. The explanation given of the mechanism that moves one of these receivers applies equally to the other, only they advance from opposite sides, and on receiving the letter called for by the key depressed withdraw from the opening in channel C, through which the type are expelled in opposite directions, Fig. 4. This withdrawal is effected by the coiled spring E⁴, Fig. 2, attached at one end to the frame A and at the other end to the receiver. This movable receiver, carrying, say, sixteen recesses or openings for type, for receiving as many as one hundred and ninety-two different characters, is made as light as possible, so as to move easily and rapidly and with the least possible momentum. It may be suspended, as shown in Fig. 5, supported by and running on wheels $e$, forming a kind of little truck which runs on track $a$ $a'$. As I have said, each one of the recesses or open mouths for the reception of type is but the extension of a tube of some light material that can be put in such form that the type as they fall foot foremost cannot rotate in their passage. Rubber tubes might be used, because, being elastic, they would allow the receiver to move freely with slight impediment. I do not limit myself to any material for these tubes, nor to their being elastic; but I have found tubes or channels of light coiled wire the best, as they are very light and elastic and easily take the shape to adapt them to any size of type that must pass through them, and are very durable, cheap, and clean.

$O^4$ is a piece which supports the lower end of the tubes $P'$, as shown in Figs. 10 and 12. It is supported by the piece $O^5$, as in Fig. 10, and is of such shape that the lower part of piece $O^2$, which forms the end of the tubes $P'$, fits snugly between the two sides of said piece $O^4$, as seen in Fig. 12. As I use only these coiled-wire tubes for conducting the type from the channel C to their final deposition in the channels N N N, I shall speak of them hereafter as "wire" tubes, not intending thereby to surrender my right to use tubes of any material suitable to perform the same functions.
The moment a key is depressed the receiver E or $E'$ presents the appropriate recess or mouth to receive the type expelled and instantly retreats to its former position, ready to start again. Previous to this last movement in retreat to resume its position, which commences upon releasing the key from under the finger, the coiled-wire tubes P, which exert a pull upon it, act as springs to bring it back. In case other than elastic tubes P are used a spring at $E^4$ would be required to bring it to the proper position, as has already been explained.

The letter A of large and small capitals and lower-case and Italic capitals and lower-case all enter the recess or mouth of the same tube. The same is true of all the B's and all the C's, and so on for all the letters. These wire tubes, connected at the upper end with the receiver E or $E'$, terminate at $T'$, Fig. 3. To this point but thirty or forty tubes have been used to pass down, say, one hundred and ninety different characters. The distribution has been but partially effected. By the lower tubes, $P'$, Fig. 3, it is completed. At the point $T'$ the upper thirty-two tubes leading from the removable receiver terminate. Arranged in gangs or rows corresponding in number with the tubes P above are one hundred and ninety-six rows, or a number to correspond with the size of the case. These rows, whether two or six, are attached together firmly at the upper part, so as to move together. Some one of the rows so adjusted below the outlets of the tubes P above as to receive into them the type as they fall is always accurately beneath the outlet of the tubes P. One row receives, say, the lower-case, another the large capitals, another the small capitals, &c. Each of the thirty-two tubes $P'$ discharges into some one of the thirty-two channels N. At the lower end of each of these tubes $P'$ is a small piece, $O^2$, (shown in Figs. 12 and 13,) made to be easily attached to the wire tube by folding together the wings $o'$, which act as clasps, the lower part readily sliding into the short fixed portion of the channel N.

Fitted in frames to support them are the removable channels—in fact, only continuations of the short channels N, into which the type drop. When these removable channels are loaded or filled with type, they are taken away to the setter and other empty ones substituted in their place to be filled in like manner. I will now proceed to explain how the lower tubes, $P'$, are adjusted at pleasure beneath the upper tubes, P, so as to receive the types as they descend, and the different type are selected and delivered to the channels N.

In Fig. 1 at Q are shown five keys to the left and slightly below the key-board. These keys are marked so as to indicate the row of the tubes $P'$ which each key actuates. One brings under the tubes P the row of the thirty-two tubes $P'$ that receives the lower-case letters, another the large capitals, and so on for all the rows of the tubes $P'$. These rows may be so arranged that their normal position may be that the center row will always be below the tubes P unless otherwise determined on by one of the keys Q, above mentioned; but in my drawings I have shown the normal arrangement to be that one of the outside rows shall be standing under the tubes P and the key Q serve to bring the others beneath the tubes P as required, the whole gang moving in one direction to accomplish this. Fig. 7 shows the mechanism by which these movements are effected. The key-heads Q actuate the levers $Q^2$, fulcrumed at $Q^3$, which levers at $Q'$ are connected by rods $Q^6$ to arms $Q^4$, which act independently of each other to slightly rotate the shaft $Q^5$.

Attached to the shaft $Q^5$ are the arms $Q^7$ and $Q^8$, that in Figs. 2, 3, and 7 serve to move the six gangs or rows of tubes $P'$ to the position predetermined for each beneath the mouth of the thirty-two tubes to receive the kind of type indicated by the moving key Q in Fig. 7. The normal position of these six rows of tubes is that one row, as explained above, shall serve for the lower-case and most-used letters and the depression of any of the five keys shall bring the gang of tubes $P'$ to a position to receive from the tubes P the descending type called for and predetermined by the key depressed. Upon the release of the key Q the gang is returned to the normal position by the action of coiled spring $T^2$.

At $Q^9$, Fig. 7, is shown a stair-shaped stop, which is fixed at its lower end to the shelf $A^4$ and regulates the movements of the levers $Q^4$, and consequently, through the intervention of the yoke $Q^{10}$, same figure, the movement also of the arms $Q^7$, which move the gang of tubes P' and determine which row thereof shall be presented under the tubes P to receive the type at the will of the operator.

The guard $Q^{10}$ about the levers $Q^4$ is firmly attached to the shaft $Q^5$ and moves freely up with the movement of any one of the levers $Q^4$, as determined by the movement of key Q. The stop $Q^9$ limits the movement of each one of the levers $Q^4$, as has been said. This movement determines the angular movement of the arm $Q^7$, which determines the position of the gang of tubes P'. This large group of lower tubes, P', as shown in Fig. 2, continues down to the short fixed channels, one of each being devoted to receive and hold the type coming down the tubes P and P', the faces of the type being all up and the printers' nicks all on the same side, as they must be in order to be properly set in the setting-machine. A whole row of these tubes P' finds the channels to receive their type ranged on one shelf—say the top one, as seen in Fig. 3 at V, the next one at V', and the next one at $V^2$, and so on for all. These tubes P' as they descend may be so spread and extended as to make all the channels N easily accessible. The type when they arrive in channels N are kept on their feet by a small piece of metal, $P^2$, that supports them on one side, while the pusher prevents their falling on the other, as shown in Fig. 3 and enlarged in Fig. 12. This small piece of metal slides along the channel easily before the type as they are shoved forward by the pusher O. When enough type has been delivered in this manner in any channel to fill it, it is removed to the setter and an empty one put in its place, with the small piece of metal, as beforesaid, in position. A spring, as shown in the central channel, Fig. 11, will answer the same purpose as the slide. Unless there were some arrangement to advance each type as it arrives in the channel N, the next one coming would find no place in which to stand, and would thus clog up the channels P', and thus bring the operation of distribution to a standstill. At the upper end of the channels N are the hammers or pushers O O O. (More clearly seen in Figs. 10 and 12.) Whenever any key of the key-board G is depressed, one gang of these hammers (see Fig. 1) moves, so as to push forward a single type in front of some one of them. I have made the hammers to operate in gangs rather than singly, in order to avoid multiplying parts and in order that they may be made very light, and since there is only one type to be moved at a time there is no difficulty in connecting them in gangs, as described.

The piece $O^7$ contains as many openings $P^3$ as there are different characters to be distributed. These openings are fitted so accurately below and close to the lower ends of the tubes P that the type descending through the tubes P cannot fail to enter the row beneath. These openings $P^3$ in the piece $O^7$ are only the mouths of the tubes P'. If there are fifteen of the tubes P, there will be fifteen of the openings $P^3$ in a line. If there are twenty or thirty of these tubes, there will be a corresponding number of these openings in a line directly below them. Since there are, for instance, thirty of the tubes P, there will be thirty of the openings $P^3$ in one line. To receive the one hundred and eighty different characters there must be then six of these lines. I have explained how this piece $O^7$ is moved to bring any one of these six lines of openings under the mouths of the tubes P at the will of the operator, though I by no means confine myself to this number or any number of tubes in a row, being governed wholly by the number of characters to be distributed in working. These six rows of tubes deliver their contents into type-channels arranged on three tables or shelves one above the other, as shown, though all might be delivered upon one table. This present arrangement necessitates connecting all the tubes P' in two rows or lines at their connection with the piece $O^7$ into one row of type-channels on each of the tables or shelves. This compels a crossing of these tubes, but in no wise interferes with the descent of the type. This upper shelf might be so widened as to receive all the tubes P', or it might be arranged in a circular or curved form with all the type-channels on the same table; but the arrangement as shown is more compact. It requires two rows or gangs of the tubes P' to fill one table—that is, if there are thirty in each row there will be on the table sixty channels to receive the two rows of thirty each.

The channels N are made to incline from the point where the type enter them, Fig. 12, in order that gravity may aid the pushers as the line becomes long. The angle at which the channels N incline should be from ten to twenty degrees from a horizontal line. At $O^4$ in Fig. 12 is shown the manner of attaching and securing the piece $O^2$, Fig. 13, to the extremity of the tubes P', and how it stands above the channel N to deliver its type B' into the short channel below, and how the type in front as they fill the channel N are supported from falling forward by the small piece $P^2$. The same figure shows the position of the pushers O O O ready to advance the type forward as they fall into their respective channels. A small section of these channels N—say to $O^3$, Fig. 12—is made permanent, and the end of the removable portion simply slips over the end of the fixed part, which holds it in position, and thus the type as they advance run easily into it.

I will now proceed to show how the hammers or pushers O, that advance the type as they fall into the channels N, are actuated.

In Fig. 15 at W is seen an arm connected to the shaft M, which shaft is moved as heretofore explained. This shaft, as has been said, has two functions. The first has been described. To actuate the pushers is the second. At the extremity of this arm W is seen the rod W', to descend through the key-board. This rod is again seen in Fig. 7 at W'. It is connected at its lower extremity to the lever $W^2$, which is firmly attached to a bar, $W^{10}$, whose ends are so bent and shaped as to enable the rod $W^5$, the fulcrum of the lever $W^2$, to pass freely through and slide thereon longitudinally, as well as to allow the free movement of the lever $W^2$. The lever $W^2$ is seen to be exactly over one of the levers $W^4$. Now if the rod connected with the rod $W^2$ at W' moves up, as it will do whenever any key of the key-board is depressed, the opposite end of the lever $W^2$ is depressed at $W^3$ in Fig. 7. This depression of the end of lever $W^2$ depresses the corresponding end of one of the three levers $W^4$, which lie directly below it and in close proximity thereto. The other end of $W^4$ consequently rises. This end is connected by the rod $W^6$ with the arm $W^8$ at $W^7$ in Fig. 12, which arm is rigidly connected with the shaft $W^9$. To this shaft the hammers O O O are also connected at such an angle with reference to the arm $W^8$ that the raising of the same by the rod connected at $W^7$ will cause a rocking movement of all the hammers on that shaft. This rocking movement causes the hammers O O O to move through the angle large enough to push forward any type in front of any one of them far enough to admit the thickest type—for instance, the letter W—that enters any channel connected with that gang of hammers, and as this movement is given by the depressing of every key of the key-board it will be seen that only one type is presented to be acted on at one time by any hammer.

It will be seen in Figs. 1, 3, and 7 that each gang of hammers has an independent connection above with one of the levers $W^4$. As the key Q in Fig. 4 determines what gang of tubes P' in Fig. 3 shall receive the descending type, and what gang of channels N shall also receive them, so the same key determines what gang of hammers shall operate. The whole number of these hammers being great, they cannot all conveniently be moved by each lever of the key-board at the same time, owing to their number and consequent resistance.

In Fig. 7 is shown the mechanism used to move the lever $W^2$ over any one of the levers $W^4$ lying beneath it. The rod X in Fig. 7 is supported on the under side of the table or key-board by a hinged joint at $X^2$. This rod is a lever of the third order, the fulcrum being at $X^2$ and the power applied to it at a point, X', by a bar which at its other extremity is connected with the arm $X^3$, which arm is rigidly connected with the shaft $Q^5$. The slight rotation of this shaft by the movement of any keys Q moves the arm $X^3$, which in turn pushes or retracts the rod $X^5$ at its free end $X^4$. This rod is connected by the short rod $X^5$ to the piece $W^{10}$, which carries the lever $W^2$, causing it to slide along the bar $W^5$ and present the lever $W^2$ over one of the levers $W^4$. While in this position the depression of any key of the key-board will move the gang of hammers connected with any of the rods $W^6$, as described and designated by its proper key.

I claim—

1. In a type-distributing machine operated by keys and provided with receptacles for the dead matter, one or more type-receivers, E E', actuated by levers constructed as described and moved by means of the keys of the key-board, substantially as and for the purposes set forth.

2. The type-receivers actuated by levers, in combination with the flexible type-channels, substantially as and for the purposes set forth.

3. The type-receivers E and E', actuated, as described, by levers and keys, in combination with the stop whereby each receiver is brought to rest at the desired point for the reception of a particular type.

4. In a type-distributing machine, one or more type-receivers, E E', actuated by and combined with the lever J, bar $J^2$, arm $J^4$, rod $J^5$, and the keys, and also combined with the stop $C^2$, substantially as described, whereby the movements of the said receivers and the channels or tubes for conveying the type to the appropriate receptacles are properly regulated.

5. In a type-distributing machine, a bar or lever hinged at one end and lying transverse to the levers of the key-board, so that each lever as it rises or falls moves the free end of said bar through a greater or less angle, which bar moves the type-receiver to its proper position for the reception of any desired letter, as and for the purposes set forth.

6. In a type-distributing machine, a pusher or hammer, combined with and actuated by a universal bar or lever, which lever is operated by each lever of the key-board, in combination with a movable type-receiver, as described.

7. In a type-distributing machine, the combination of the stop device R with the lever H, crank-lever I, arm $h^5$, sector $h^3$, and gear $r$, as and for the purposes described, the lever H being hinged at one end and operating in a reverse way from the levers operating the receiver.

8. A key-board and the levers and their connections operated thereby, in combination with a movable type-receiver and elastic tubes, as and for the purposes described, whereby the type are operated at will and each type deposited in its proper channel.

9. The automatic device for feeding forward the type, consisting of pusher B and spring S, in combination with the movable type-receiver, and the hammer F, and the key-board, and the mechanism connected with and operating the several parts, whereby the said several parts are operated substantially in the manner and for the purpose set forth.

10. In combination with the tubes P', the piece $O^2$ and support $O^4$, whereby the ends of the said tubes are held and sustained.

11. In combination with the rotating shaft M, the vertical shaft $M^3$, and ratchet $m^4$, the pawl, the arms $M^2$ and $m^2$ between the shaft and ratchet, the ratchet C', and lever for operating the type-pusher, substantially as described.

12. The stop-cylinder R, having teeth or pieces helically arranged on its periphery and operated by the key-levers G', the levers H, and the bell-crank lever I, connected with H at $h^4$, the piece $h^5$, actuating the sector $h^3$, as and for the purposes described.

13. In combination with the lever F, having hammer F', the ratchet C', actuated as set forth, and the spring $F^2$, and movable receivers E and E', whereby said lever is automatically thrown forward to expel the type from the type-channel.

14. In combination with the pusher-bar B, having a rack on its lower edge, the spring S and gear-wheel $D^3$, whereby the type are automatically pushed forward from the galley, substantially as described.

15. In a type-distributing machine, the elastic tubes P', arranged in gangs and movable, combined with the piece $O^2$, the piece $O^4$, and the hammer O and its actuating-rod $W^6$, as and for the purposes described.

16. In a type-distributing machine, the lever $Q^7$ and arm $Q^8$, in combination with the channels P', the piece T, the hammers O in gangs, and the channels N.

17. The piece $O^2$, having edges, combined with the ends of the wire tubes P', whereby the ends of said tubes are protected and held in place, and the piece $O^4$ and tubes N.

18. The sliding lever $W^2$, actuated as described, in combination with the levers $W^4$, the rods $W^6$, the hammers O, and channels N, substantially as described.

19. The receivers E E', moved by the key-actuated levers, substantially as described, and the channel C, combined with the trucks c and the coiled spring $E^4$, the stop, and the rail or track.

20. In a type-distributing machine, the key-levers $Q^2$, rods $Q^6$, and actuating-levers $Q^4$, in combination with the double lever $Q^{10}$, and shaft $Q^5$, the arm $Q^7$, the step-shaped piece $Q^9$, and the tubes P P', as and for the purposes set forth.

In testimony whereof I affix my signature in presence of two witnesses.

LORENZO DOW.

Witnesses:
W. L. BOYDEN.
G. W. BALLOCH.